(12) United States Patent
Kale et al.

(10) Patent No.: US 11,909,637 B2
(45) Date of Patent: Feb. 20, 2024

(54) ORCHESTRATION OF TENANT OVERLAY NETWORK CONSTRUCTS

(71) Applicant: VMware LLC, Palo Alto, CA (US)

(72) Inventors: Akshay Kale, Sunnyvale, CA (US); Anil Lohiya, Cupertino, CA (US); Fang Peng, Saratoga, CA (US); Maheedhar Nallapareddy, Newark, CA (US); Jianjun Shen, Redwood City, CA (US)

(73) Assignee: VMware LLC, Palo Alto, CA (US)

( * ) Notice: Subject to any disclaimer, the term of this patent is extended or adjusted under 35 U.S.C. 154(b) by 145 days.

(21) Appl. No.: 17/376,106

(22) Filed: Jul. 14, 2021

(65) Prior Publication Data

US 2023/0013269 A1  Jan. 19, 2023

(51) Int. Cl.
 *H04L 45/64* (2022.01)
 *H04L 45/586* (2022.01)
 *H04L 41/0806* (2022.01)
 *H04L 12/46* (2006.01)
 *H04L 12/66* (2006.01)

(52) U.S. Cl.
 CPC .......... *H04L 45/64* (2013.01); *H04L 12/4641* (2013.01); *H04L 12/66* (2013.01); *H04L 41/0806* (2013.01); *H04L 45/586* (2013.01)

(58) Field of Classification Search
 CPC ..................................................... H04L 45/64
 See application file for complete search history.

(56) References Cited

U.S. PATENT DOCUMENTS

| | | | |
|---|---|---|---|
| 10,536,563 B2* | 1/2020 | Wang | H04L 12/4633 |
| 10,944,691 B1* | 3/2021 | Raut | H04L 45/64 |
| 2015/0082301 A1* | 3/2015 | Garg | H04L 41/12 718/1 |
| 2016/0036774 A1* | 2/2016 | Chong | G06F 9/455 370/392 |
| 2016/0105393 A1* | 4/2016 | Thakkar | H04L 67/125 709/220 |
| 2016/0299775 A1* | 10/2016 | Madapurath | H04L 12/4633 |
| 2018/0123827 A1* | 5/2018 | Josyula | H04L 12/4641 |
| 2019/0020491 A1* | 1/2019 | Boutros | H04L 45/16 |
| 2019/0068493 A1* | 2/2019 | Ram | H04L 12/4641 |

(Continued)

*Primary Examiner* — Guang W Li
(74) *Attorney, Agent, or Firm* — Quarles & Brady LLP

(57) ABSTRACT

A method for creating overlay networking constructs to establish network connectivity between virtual routers and remote physical gateways is provided. An orchestrator receives a mapping between tenant network identifiers for multiple tenant networks and overlay network identifiers for multiple overlay networks. The orchestrator attaches a virtual router to a parent logical port of an overlay logical switch for connectivity between a physical gateway and the multiple tenant networks. The orchestrator creates multiple child logical ports that are sub-interfaces of the parent logical port. Each child logical port is uniquely identified by a tenant network identifier. The orchestrator connects multiple child logical switches to the multiple child logical ports according to the received mapping. Each child logical switch is uniquely identified by an overlay network identifier. The orchestrator establishes multiple overlay networks based on the child logical switches to tunnel data between the physical gateway and the child logical ports.

18 Claims, 6 Drawing Sheets

(56) References Cited

U.S. PATENT DOCUMENTS

| | | | |
|---|---|---|---|
| 2019/0158397 A1* | 5/2019 | Liu | H04L 12/4633 |
| 2019/0306085 A1* | 10/2019 | Zhang | H04L 41/0654 |
| 2020/0112515 A1* | 4/2020 | Brar | H04L 63/10 |
| 2020/0213225 A1* | 7/2020 | Han | H04L 45/74 |
| 2020/0220767 A1* | 7/2020 | Stabile | H04L 41/044 |
| 2021/0218652 A1* | 7/2021 | Raut | H04L 41/0803 |
| 2023/0299992 A1* | 9/2023 | Gampel | H04L 61/5069 |
| | | | 709/223 |

* cited by examiner

ORCHESTRATION OF TENANT OVERLAY NETWORK CONSTRUCTS

BACKGROUND

A virtual local area network, or VLAN, is a collection of devices or network nodes that communicate with one another similar to a single local area network (LAN), when in reality they exist in one or more LAN segments in the same or different physical locations. A Virtual Extensible LAN (VXLAN) is an encapsulation protocol that provides datacenter connectivity using tunneling to stretch Layer 2 (L2) connections over an underlying Layer 3 (L3) network. A VXLAN header includes an VXLAN network identifier (VNI) that is used to uniquely identify the VXLAN. The VNI is similar to a virtual (VLAN) identifier but having 24 bits to allow many more VXLANs than VLANs.

An Ethernet Virtual Private Network (EVPN) is a technology for carrying L2 ethernet traffic as a virtual private network (VPN) using wide area network (WAN) protocols. EVPN can support L3 virtualization for newer applications while providing L2 connectivity for older applications. EVPN works with L2 protocols like VXLAN to create virtual tunnels. EVPN technologies include Ethernet VPN over Multiprotocol Label Switching (EVPN-MPLS) and Ethernet VPN over VXLAN (EVPN-VXLAN).

SUMMARY

Some embodiments of the invention provide a method for creating overlay networking constructs to establish network connectivity between virtual routers and remote physical gateways in an Ethernet Virtual Private Network (EVPN) setting. An orchestrator receives mappings between tenant network identifiers for multiple tenant networks and overlay network identifiers for multiple overlay networks. The orchestrator attaches a virtual router to a parent logical port of an overlay logical switch for connectivity between a physical gateway and the multiple tenant networks. The orchestrator creates multiple child logical ports that are sub-interfaces of the parent logical port. The orchestrator connects multiple child logical switches to the multiple child logical ports according to the received mapping. The orchestrator establishes multiple overlay networks based on the child logical switches to tunnel data between the physical gateway and the child logical ports. Each overlay network is associated with an overlay network identifier for tunneling data traffic from a child logical switch identified by a same overlay network identifier to the physical gateway.

In some embodiments, the network virtualization manager exposes an application program interface (API), and the orchestrator receives definitions and updates of the mappings from the API. In some embodiments, the orchestrator also receives an overlay transport zone definition that identifies a collection of host machines that are within a span of the overlay logical switch from the API. In some embodiments, the tenant network identifier is a virtual local area network (VLAN) identifier, the overlay network is a virtual extensible local area network (VXLAN), and the overlay network identifier is a VXLAN network identifier (VNI). Each overlay network is for carrying data traffic that is tagged with a tenant network identifier and encapsulated with a corresponding overlay network identifier according to the mapping. In some embodiments, the orchestrator also validates the mapping between the tenant network identifiers and overlay network identifiers based on a pool (or list) of available overlay network identifiers.

Each child logical port is uniquely identified by a tenant network identifier. Each child logical switch is uniquely identified by an overlay network identifier. In some embodiments, the virtual router has multiple parent logical ports, and each parent port is associated with multiple child logical ports. In some embodiments, the virtual router, the overlay logical switch, the multiple child logical ports, and the multiple child logical switches are implemented by one or more host machines running virtualization software.

The preceding Summary is intended to serve as a brief introduction to some embodiments of the invention. It is not meant to be an introduction or overview of all inventive subject matter disclosed in this document. The Detailed Description that follows and the Drawings that are referred to in the Detailed Description will further describe the embodiments described in the Summary as well as other embodiments. Accordingly, to understand all the embodiments described by this document, a full review of the Summary, Detailed Description, the Drawings, and the Claims is needed. Moreover, the claimed subject matters are not to be limited by the illustrative details in the Summary, Detailed Description, and the Drawings, but rather are to be defined by the appended claims, because the claimed subject matters can be embodied in other specific forms without departing from the spirit of the subject matters.

BRIEF DESCRIPTION OF THE DRAWINGS

The novel features of the invention are set forth in the appended claims. However, for purposes of explanation, several embodiments of the invention are set forth in the following figures.

DETAILED DESCRIPTION

In the following detailed description of the invention, numerous details, examples, and embodiments of the invention are set forth and described. However, it will be clear and apparent to one skilled in the art that the invention is not limited to the embodiments set forth and that the invention may be practiced without some of the specific details and examples discussed.

An Ethernet Virtual Private Network over Virtual Extensible Local Area Network (EVPN-VXLAN) is a widely deployed technology to support layer 2 (L2) extension over the IP fabric. A typical implementation of EVPN-VXLAN involves creating a logical interface for each L2 domain identified by a virtual network interface (VNI). Telephone companies are increasingly deploying network functions in virtual form factors where it is easier and more cost effective to create additional instances of the virtual network functions. When virtual network functions such as virtual routers (vRouters) are deployed in a network virtualization environment under a network virtualization manager (e.g., VMware NSX®), it is a scaling challenge to support a large number of logical interfaces and the logical switches that correspond to different tenants.

Some embodiments of the invention provide a scalable, fault-tolerant, and secure platform for automatically creating L2 overlay networking constructs such as logical switches/ segments and logical ports required for network connectivity between vRouters and remote gateways in an EVPN-VXLAN setting. The method uniquely defines and stores EVPN-tenant specific network information and manages sub-interfaces and logical switches at scale. Deployment of virtual network functions (such as vRouters) in the network virtualization environment can be seamlessly automated.

In some embodiments, a VM's interface is used as a parent interface for creating multiple logical sub-interfaces of L2 segments. Each of these logical sub-interfaces are attached to an overlay logical segment based on constructs created by the network virtualization manager. When setting up the sub-interfaces and attaching the sub-interfaces to the overlay logical switches, one VXLAN tunnel per tenant virtual routing and forwarding (VRF) table will be generated at a host machine running virtualization software (e.g., ESXi hypervisor) to establish the connectivity between a vRouter and a remote gateway. The virtualization software then maps VLAN-tagged tenant traffic coming from the vRouter to a VXLAN VNI, and uses the VXLAN VNI for overlay encapsulation and forwarding to a physical gateway. Many such logical sub-interfaces can be created based on a parent interface. In some embodiments, tenant VLAN IDs act as unique identifiers that distinguish sub-interfaces associated with a parent interface.

Figure 1:
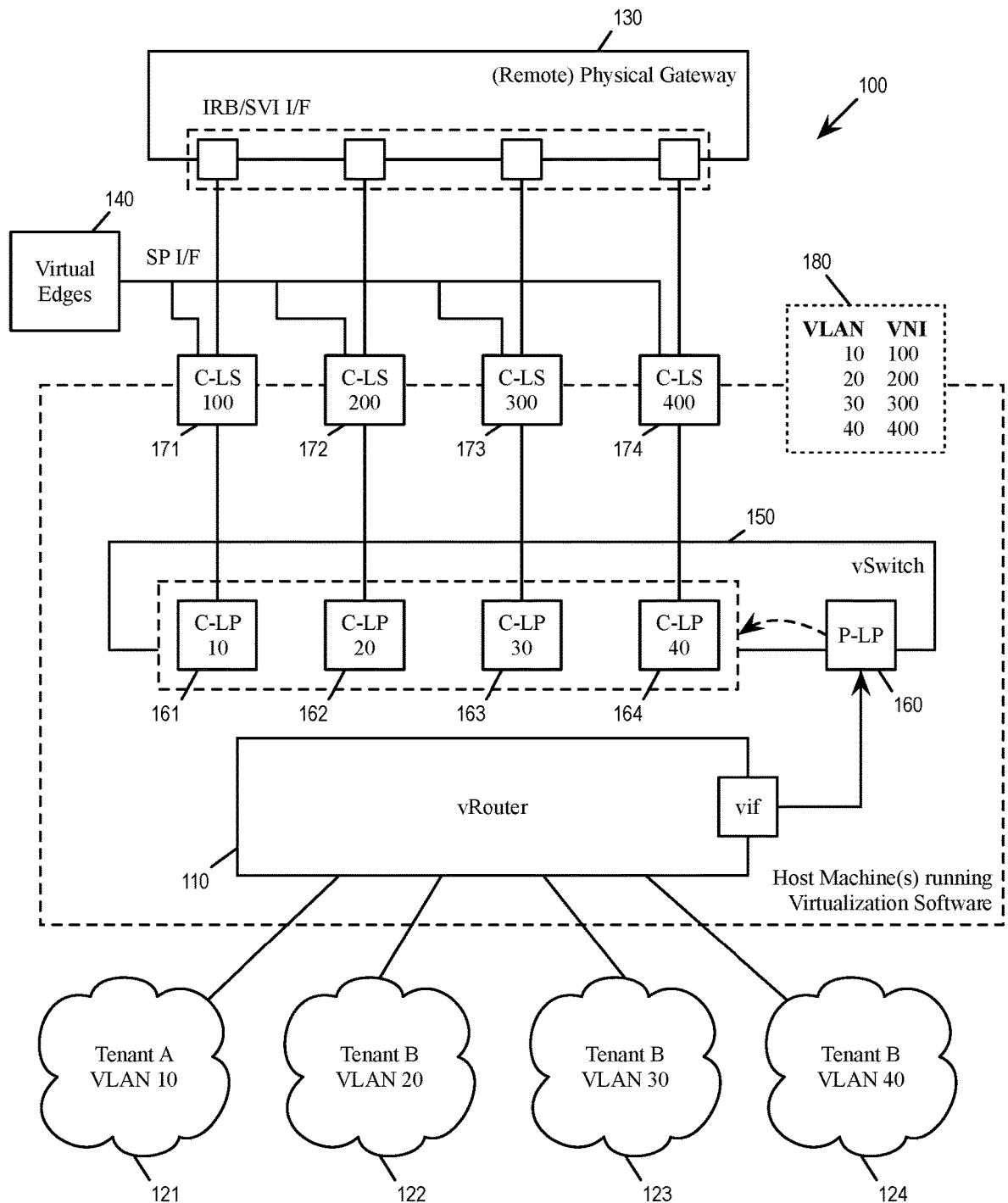
FIG. 1 conceptually illustrates a network virtualization environment for EVPN-VXLAN, in which logical sub-interfaces are created to direct traffic between VLANs of different tenants to a remote physical gateway through VXLAN tunnels.

FIG. 1 conceptually illustrates a network virtualization environment 100 for EVPN-VXLAN, in which logical sub-interfaces are created to direct traffic between VLANs of different tenants to a remote physical gateway through VXLAN tunnels. The figure illustrates a network virtualization environment 100 in which a host machine operating virtualization software or hypervisors (e.g., VMware ESXi™) implements virtual (or logical) L3 routers and virtual L2 switches. The network virtualization environment 100 is managed by a network virtualization manager. A virtual router 110 (vRouter) is used to conduct data traffic from tenant networks 121-124 to a remote physical gateway 130. The vRouter 110 is implemented by one or more VMs running the virtualization software. The VM(s) implementing the vRouter is referred to as the vRouter VM.

Each of the tenant networks 121-124 is implemented as a VLAN. The tenant network 121 belongs to tenant A and has a VLAN ID 10. The tenant network 122 belongs to tenant B and has a VLAN ID 20. The tenant network 123 belongs to tenant C and has a VLAN ID 30. The tenant network 124 belongs to tenant D and has a VLAN ID 40. The vRouter 110 is configured to originate the packets tagged with VLAN IDs 10, 20, 30, and 40 that respectively corresponding to tenants A, B, C, and D. A managed edge 140 (e.g., NSX edge) and the physical gateway 130 are configured to process the packets for these four tenants in the control and the data plane.

A virtual interface (vif) of the vRouter 110 is attached to a virtual (or logical) switch 150 (or vSwitch) at a parent interface (or parent logical port or P-LP) 160, which provides logical L2 connectivity between the vRouter 110 and the physical gateway 130. In some embodiments, the vSwitch 150 is a distributed switch that is implemented across multiple host machines. The vSwitch 150 provides four sub-interfaces 161-164 that are child logical ports (or C-LP) of the parent logical port 160. The four child logical ports 161-164 respectively correspond to VLAN IDs 10, 20, 30, and 40. When a packet tagged with a VLAN ID is received from the vRouter VM's virtual interface at the virtual switch 150, the VLAN ID is mapped to the child interface associated with that VLAN and the packet is further processed in the context of the child interface (or C-LP) 161-164. Having the notion of the interface (e.g., child interface) as opposed to VLANs facilitates the operations of interface-based service features.

Each child interface (or C-LP) is connected to a child logical switch (C-LS) that is associated with a VXLAN VNI. In the figure, the C-LPs 161-164 are connected to a C-LS 171-174, respectively. Each C-LS 171-174 supports a VXLAN tunnel providing L2 connection from its connected C-LP 161-164 to the physical gateway 130, and the C-LSs 171-174 are associated with VXLAN VNIs 100, 200, 300, 400, respectively. For example, a packet tagged with VLAN ID 20 (i.e., from tenant network 122) will be received by the vSwitch 150 at child logical port 162. The interconnection of the C-LP 162 would send the packet to be processed by the C-LS 172 having VNI 200. The packet is transported over a corresponding VXLAN tunnel and inherits the VNI (by encapsulation) to the remote physical gateway 130. The C-LSs 171-174 also allow the managed edge 140 access (via service port interface or SP I/F) to control plane traffic between the vRouter 110 and the physical gateway 130.

In some embodiments, the C-LSs 171-174 are auto-generated overlay logical switches that are uniquely identified by VNIs and therefore map individually to distinct tenant VLANs. In some embodiments, the interconnections between the C-LPs 161-164 and the C-LSs 171-174 effectuates a set of translation mappings 180 between VLAN IDs and VXLAN VNIs (i.e., mapping between tenant networks and overlay tunnels to the physical gateway). In some embodiments, the VLAN ID to VNI mapping 180 is specified by the user through the network virtualization manager.

The VXLAN tunnels (or C-LSs) terminate at the physical gateway 130, and the VNI in the packet is mapped to a bridge domain which is connected to a VRF instance. The outgoing packet is processed by the VRF instance as a L3 packet and forwarded further. Conversely, when a packet is received from the physical gateway 130 and the destination IP is set to the VTEP IP of a host machine running virtualization software, the VXLAN tunnel is terminated and the inner packet is processed as a L2 packet. The logic switch (LS) to process the inner packet is determined from the VNI in the VXLAN packet.

In some embodiments, one VXLAN tunnel per tenant VRF is created between a vRouter and a remote gateway. Setting up the multiple VXLAN tunnels (for different tenants or different VRFs) is based on setting up multiple sub-interfaces 161-164, attaching them to overlay logical switches 171-174, and implementing/connecting them together at the distributed vSwitch 150. As the vSwitch 150 is implemented by virtualization software running in host machines, the virtualization software also maps the VLAN tagged traffic coming from the vRouter 110 to a VXLAN VNI and uses the VXLAN VNI for overlay encapsulation forwarding to a physical gateway 130.

As mentioned, the port 160 on the vSwitch 150 to which the virtual interface of the vRouter VM 110 is connected to, serves as a parent interface (parent port or P-LP). This parent interface or port 160 is generated in the system when the vRouter VM 110 is attached to a pre-created overlay logical switch (e.g., the vSwitch 150). In some embodiments, an EVPN-tenant orchestrator automatically generates the C-LSs and the C-LPs according to an EVPN-tenant translation mapping provided by a user.

A user may create thousands of such sub-interfaces and associate them to a parent-interface. A tenant VLAN ID may act as a unique identifier to distinguish a particular sub-interface from other sub-interfaces associated with a same parent interface. In some embodiments, multiple EVPN tenants may reuse the same VLANs for their VXLAN tunnel translations by creating multiple such VLAN to VXLAN VNI mappings to reuse VLAN IDs. In some embodiments, each parent interface can support 4K sub-interfaces (as there are 12 bits in a VLAN ID). Thus, a vRouter having 8 parent interfaces with the vSwitch can support 32K distinct sub-interfaces, which translates to 32K distinct tenant traffic running on 32K VXLAN tunnels.

Figure 2:
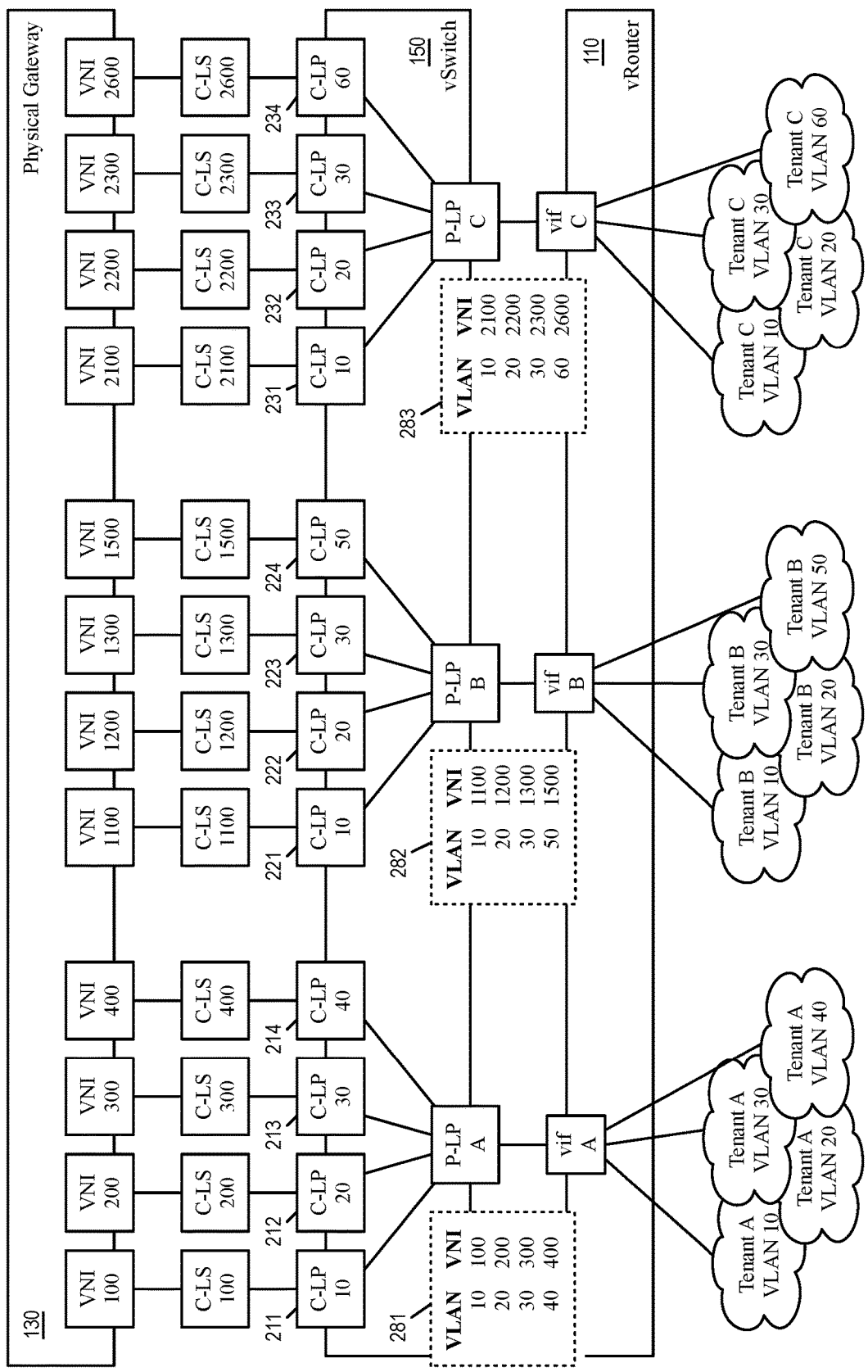
FIG. 2 conceptually illustrates using multiple VLAN to VNI mappings to implement EVPN-VXLAN.

FIG. 2 conceptually illustrates using multiple VLAN to VNI mappings to implement EVPN-VXLAN. Specifically, different tenants have different VLAN to VNI mappings. By using multiple mappings, different tenants are allowed to use the same VLAN IDs to map to different VNIs. The figure illustrates the vRouter 110 handling traffic between tenants A, B, and C and the physical gateway 130. Each tenant has several VLANs, and each tenant has its own translation mapping for translating VLAN IDs into VXLAN VNIs. As illustrated, tenants A, B, and C use mapping tables 281, 282, and 283, respectively. These mapping tables 281-283 are specified by the user through the network virtualization manager, and the host machine(s) are configured to set up parent logical ports, child logical ports, and child logical switches according to the mappings.

As shown in the mapping tables 281-283, at least some of the VLAN IDs of tenant A are the same as those of tenants B and C (e.g., VLAN IDs 10, 20, and 30). However, different tenants use (or are associated with) different parent logical ports (in the example, VLANs of tenants A, B, and C use P-LP A, P-LP B, and P-LP C, respectively.) The different VLANs of a tenant are associated with different child logical ports of the parent logical port of the tenant (P-LP A is associated with child logical ports C-LPs 211-214; P-LP B is associated with child logical ports C-LPs 221-224; P-LP C is associated with child logical ports C-LPs 231-234), and each child logical port is uniquely associated with a VLAN ID of the corresponding tenant. Since the VLANs of different tenants are associated with child logical ports of different parent logical ports, the same VLAN IDs may be reused by different tenants.

Furthermore, each C-LP is mapped to a different child logical switch for sending VXLAN traffic with a unique VNI. In the example of FIG. 2, tenant A has a VLAN with ID 10 that is mapped to VNI 100, while tenant B also has a VLAN with ID 10, but that VLAN is mapped to VNI 1100.

In some embodiments, the EVPN-tenant translation mapping is a VLAN to VXLAN VNI network translation map. The translation mapping can be leveraged by individual tenants for translating VLAN-VXLAN data and for forwarding tenant VM traffic over overlays in the network virtualization environment. In some embodiments, the user may define the mapping as a part of the EVPN-tenant specific network intent as a network virtualization management policy (e.g., NSX-T policy). In some embodiments, the NSX-T policy is used by the EVPN-tenant orchestrator to generate the C-LSs and C-LPs needed for the connectivity towards the physical gateway.

In order to support the automated setting-up of sub-interfaces and attaching the sub-interfaces to the logical switches/segments, some embodiments uniquely define, store, and manage EVPN-tenant specific network information (e.g., connectivity translation mapping) at the management plane of the network virtualization manager. In some embodiments, the network virtualization manager orchestrates L2 overlay networking constructs (i.e., logical switches and logical ports) required for connectivity between virtual routers and physical gateways. In some embodiments, RESTful APIs are exposed for the user to define and manage the VLAN to VNI network translation mapping. Implementation complexities such as managing sub-interfaces and establishing hierarchies based on a parent-interface can remain hidden from the user.

In some embodiments, the network virtualization manager generates the L2-overlay networking constructs such as the C-LSs and C-LPs in order to ease the configuration burden from the user and achieve a seamless on-boarding of tenants in an EVPN-VXLAN setting. In some embodiments, an EVPN-tenant orchestrator is implemented within the network virtualization manager, specifically at a policy management module (e.g., NSX-T® Policy manager). The orchestrator receives EVPN-tenant network intent from the user and realizes the user intent by auto-plumbing (generating and attaching) C-LSs and C-LPs internally on a distributed hypervisor switch (e.g., the vSwitch 150). The EVPN-tenant network intent can be defined at the policy management module to uniquely store and manage VLAN to VXLAN VNI translation mappings (that are specific to individual EVPN-tenant instances). In some embodiments, the mappings are exposed as enterprise level RESTful APIs so the life-cycles of the EVPN-tenant instances can be managed by users. The EVPN-tenant orchestrator allows for the maintaining of thousands of unique VLAN to VXLAN VNI network translation mappings of thousands of tenant VMs.

Figure 3:
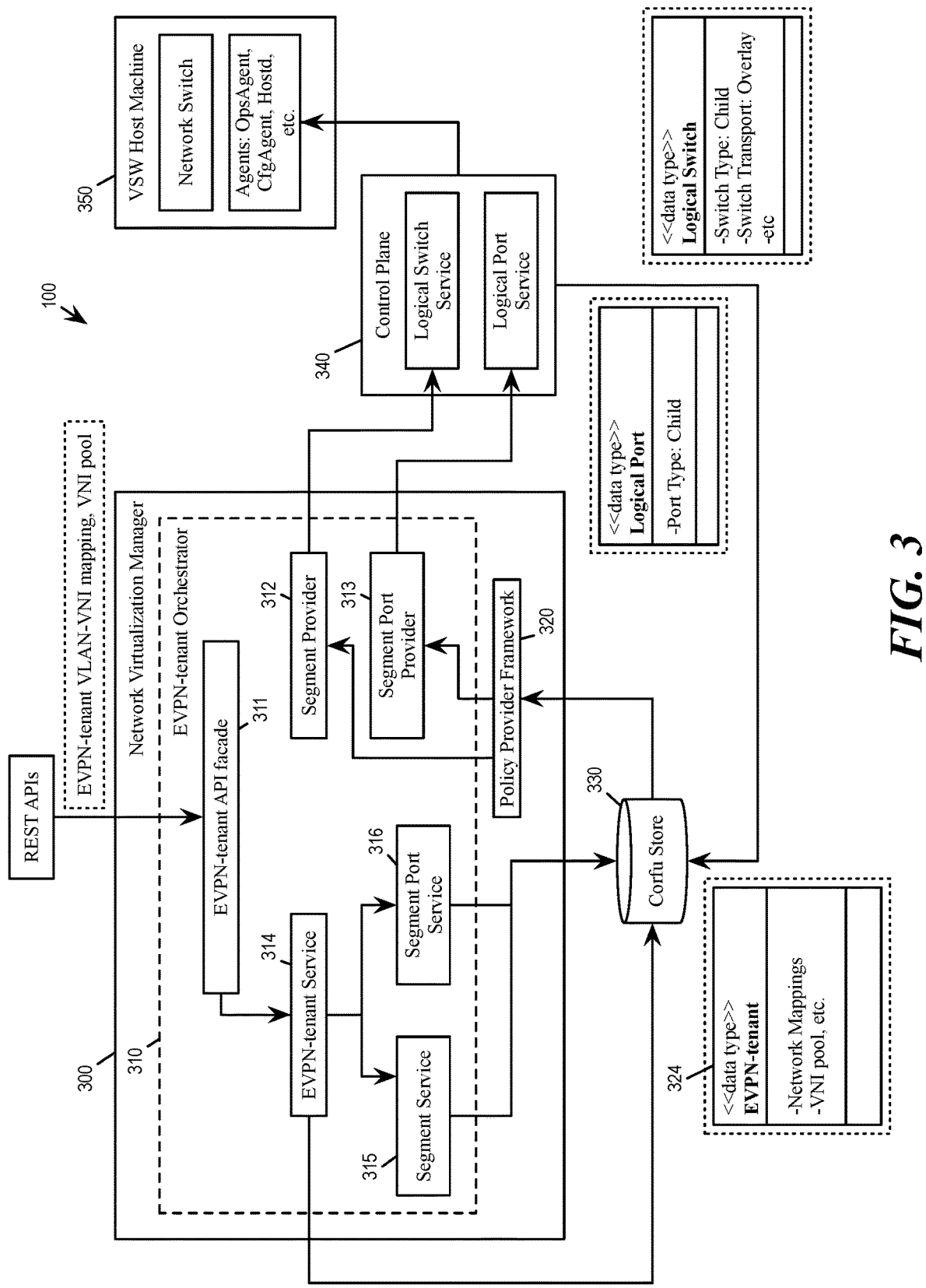
FIG. 3 conceptually illustrates components of a network virtualization manager that implements an EVPN-tenant orchestrator in the network virtualization environment.

FIG. 3 conceptually illustrates components of a network virtualization manager 300 that implements an EVPN-tenant orchestrator 310 in the network virtualization environment 100. The network virtualization manager 300 is a system implemented by one or more computing devices in a control cluster or management cluster of a datacenter. The network virtualization manager 300 may be implemented by a bare metal computing device or as a virtual machine (VM) in a host machine running virtualization software.

As illustrated, the network virtualization manager 300 implements an EVPN-tenant orchestrator 310 and a policy provider framework 320. In some embodiments, the EVPN-tenant orchestrator 310 is part of a network policy module within the network virtualization manager 300. The EVPN-tenant orchestrator 310 includes an EVPN-tenant API façade 311, a segment provider 312, a segment port provider 313, an EVPN-tenant service 314, a segment service 315, and a segment port service 316. In some embodiments, the modules 311-316 are modules of software instructions being executed by one or more processing units (e.g., a processor) of a computing device. In some embodiments, the modules 311-316 are modules of hardware circuits implemented by one or more integrated circuits (ICs) of an electronic apparatus. Though the modules 311-316 are illustrated as being separate modules, some of the modules 311-316 can be combined into a single module.

The figure illustrates dataflow between the components of the EVPN-tenant orchestrator 310 as it performs the following operations:

(1) The orchestrator 310 accepts user input through REST APIs invoked at the network virtualization manager 300 to receive a VLAN-VNI translation mapping, an overlay-TZ, and a VNI-pool. In some embodiments, an overlay-TZ, or transport zone, is used to define the scope of the VXLAN overlay network by defining a collection of host machines that can communicate with each other and by defining the span of logical switches. The user may create the VM (e.g., for vRouter 110) at a cloud computing virtualization platform (e.g., VMware vSphere®). The user may create the VNI pool and the overlay overlay-TZ at the management plane of the network virtualization environment. The user may attach the (vRouter) VM to an overlay logical switch (P-LS) created in the same overlay-TZ. Attaching the (vRouter) VM to the logical switch automatically creates a (parent) logical port (P-LP).

(2) The orchestrator 310 internally performs validations on the provided input to ensure that the mapping is unique, and that the VNIs used are available and valid (e.g., consistent with the VNI pool).

(3) The orchestrator 310 (at the EVPN-tenant service module 314) stores the EVPN-tenant intent 324 at a CORFU store 330 and generates intent of child segments/switches and child ports based on the mapping. (CORFU is a cluster of flash drives organized as a single shared log that can be accessed concurrently by multiple clients over the network.)

(4) A policy framework 320 uses the segment provider 312 and the segment port provider 313 to realize the EVPN-tenant intent 324 (that was received from the APIs) as child logical switches and ports (C-LSs and C-LPs) to establish a parent-child hierarchy.

(5) The network virtualization manager 300 provisions the logical switches and ports by communicating with controllers of the control plane or management plane 340 of the network virtualization environment 100. Agents running on the virtualization software in host machines 350 create individual VXLAN tunnels for C-LPs to serve VLAN-tagged tenant traffic.

Figure 4:
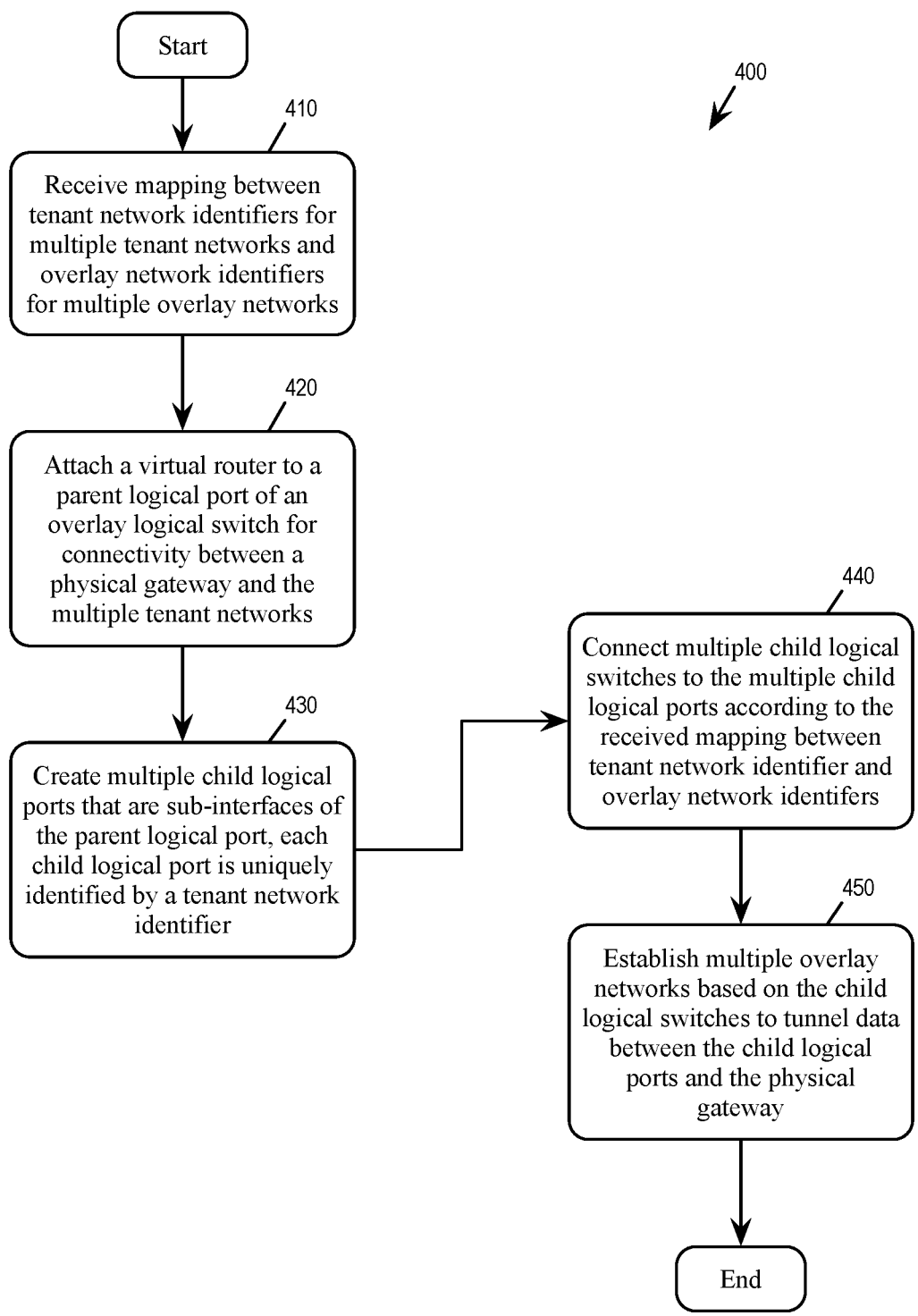
FIG. 4 conceptually illustrates a process for creating sub-interfaces to conduct data traffic between tenant networks and a physical gateway.

FIG. 4 conceptually illustrates a process 400, for some embodiments, for creating sub-interfaces to conduct data traffic between tenant networks and a physical gateway. In some embodiments, one or more processing units (e.g., processor) of a computing device implementing the EVPN-tenant orchestrator 310 and/or the network virtualization manager 300 perform the process 400 by executing instructions stored in a computer-readable medium.

In some embodiments, the process 400 starts when the orchestrator receives (at 410) a mapping between the tenant network identifiers for multiple tenant networks and the overlay network identifiers for multiple overlay networks. In some embodiments, the network virtualization manager exposes the application program interface (API), and the orchestrator receives the definition and an update of the mapping from the API. In some embodiments, the orchestrator also receives an overlay transport zone definition that identifies a collection of host machines that are within a span of the overlay logical switch from the API.

In some embodiments, the tenant network identifier is a VLAN identifier, the overlay network is a VXLAN, and the overlay network identifier is a VXLAN VNI. Each overlay network is for carrying data traffic that is tagged with a tenant network identifier and encapsulated with a corresponding overlay network identifier according to the mapping. In some embodiments, the orchestrator also validates the mapping between the tenant network identifiers and overlay network identifiers based on a pool (or list) of available overlay network identifiers.

A first tenant has a first mapping between tenant network identifiers and overlay network identifiers, and a second tenant has a second mapping between tenant network identifiers and overlay network identifiers. A same tenant network identifier can be mapped to a first overlay network identifier for the first tenant and can also be mapped to a second, different overlay network identifier for the second tenant (i.e., different tenants may reuse the same VLAN ID).

The process 400 attaches (at 420) a virtual router to a parent logical port of an overlay logical switch for connectivity between a physical gateway and the multiple tenant networks. The process 400 creates (at 430) multiple child logical ports that are sub-interfaces of the parent logical port. Each child logical port is uniquely identified by a tenant network identifier. In some embodiments, the virtual router has one or more parent logical ports that are associated with multiple child logical ports.

The process 400 connects (at 440) multiple child logical switches to the multiple child logical ports according to the received mapping between the tenant network identifiers and overlay network identifiers. Each child logical switch is uniquely identified by an overlay network identifier. The virtual router (e.g., the vRouter 110), the overlay logical switch (e.g., the vSwitch 150), the multiple child logical ports (e.g., C-LPs 161-164), and the multiple child logical switches (e.g., C-LSs 171-174) are implemented by one or more host machines running virtualization software.

The process 400 establishes (at 450) multiple overlay networks based on the child logical switches to tunnel data between the physical gateway and the child logical ports. Each overlay network is associated with an overlay network identifier for tunneling data traffic from a child logical switch identified by a same overlay network identifier to the physical gateway. Upon establishing the multiple overlay networks, the process 400 ends.

Figure 5:
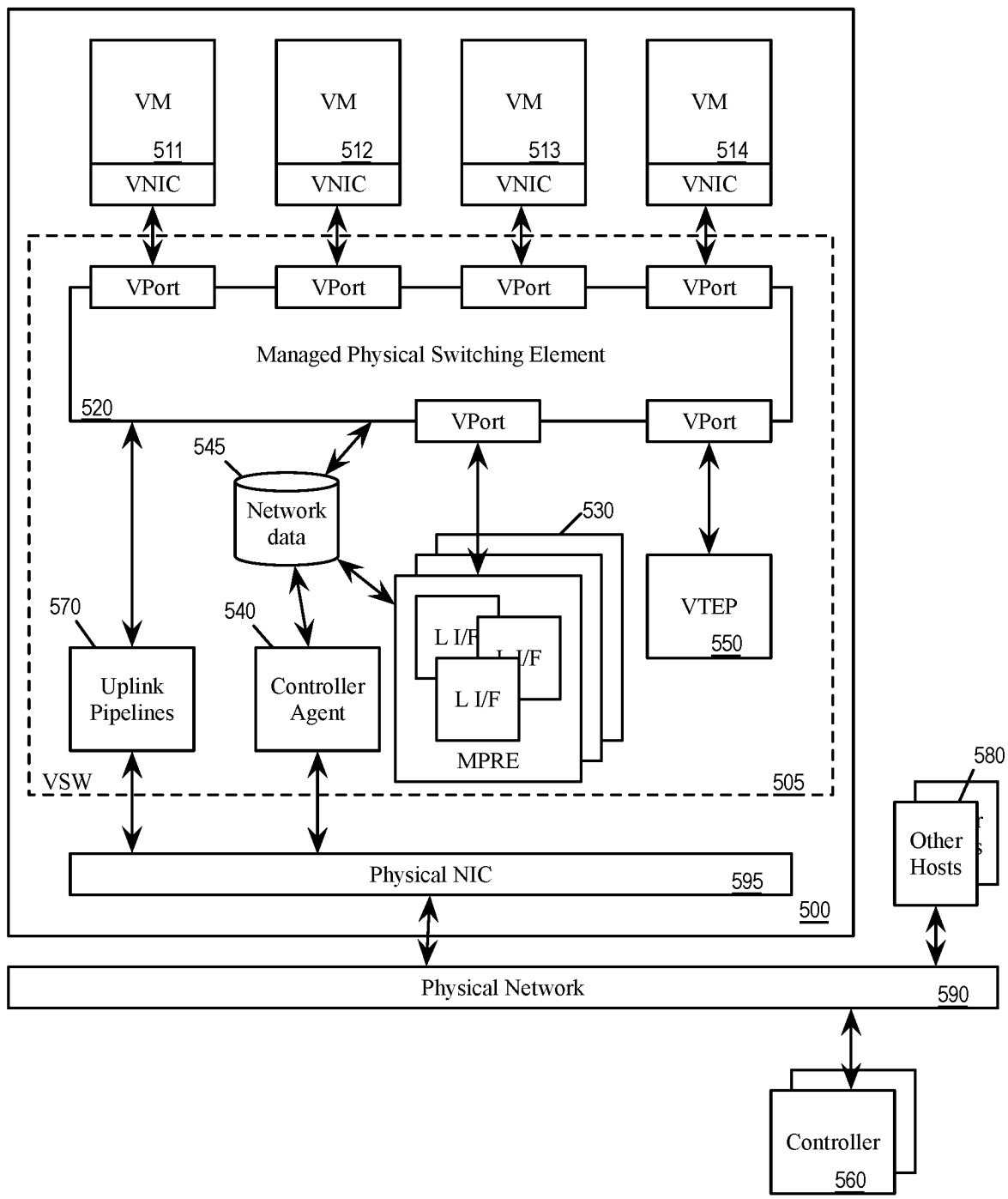
FIG. 5 illustrates a computing device that serves as a host machine that runs virtualization software.

In some embodiments, the virtual router, the virtual switch, the child logical ports, and the child logical switches may be implemented by a host machine that is running virtualization software, serving as a virtual network forwarding engine. Such a virtual network forwarding engine is also known as a managed forwarding element (MFE), or hypervisor. Virtualization software allows a computing device to host a set of virtual machines (VMs) or data compute nodes (DCNs) as well as to perform packet-forwarding operations (including L2 switching and L3 routing operations). These computing devices are therefore also referred to as host machines. The packet forwarding operations of the virtualization software are managed and controlled by a set of central controllers, and therefore the virtualization software is also referred to as a managed software forwarding element (MSFE) in some embodiments. In some embodiments, the MSFE performs its packet forwarding operations for one or more logical forwarding elements as the virtualization software of the host machine operates local instantiations of the logical forwarding elements as physical forwarding elements. Some of these physical forwarding elements are managed physical routing elements (MPREs) for performing L3 routing operations for a logical routing element (LRE), while some of these physical forwarding elements are managed physical switching elements (MPSEs) for performing L2 switching operations for a logical switching element (LSE). FIG. 5 illustrates a computing device 500 that serves as a host machine that runs virtualization software 505 for some embodiments of the invention.

As illustrated, the computing device 500 has access to a physical network 590 through a physical NIC (PNIC) 595.

The host machine 500 also runs the virtualization software 505 and hosts VMs 511-514. The virtualization software 505 serves as the interface between the hosted VMs 511-514 and the physical NIC 595 (as well as other physical resources, such as processors and memory). Each of the VMs 511-514 includes a virtual NIC (VNIC) for accessing the network through the virtualization software 505. Each VNIC in a VM 511-514 is responsible for exchanging packets between the VM 511-514 and the virtualization software 505. In some embodiments, the VNICs are software abstractions of physical NICs implemented by virtual NIC emulators.

The virtualization software 505 manages the operations of the VMs 511-514 and includes several components for managing the access of the VMs 511-514 to the physical network 590 (by implementing the logical networks to which the VMs connect, in some embodiments). As illustrated, the virtualization software 505 includes several components, including a MPSE 520, a set of MPREs 530, a controller agent 540, a network data storage 545, a VTEP 550, and a set of uplink pipelines 570.

The VTEP (virtual tunnel endpoint) 550 allows the host machine 500 to serve as a tunnel endpoint for logical network traffic. An example of the logical network traffic is traffic for VXLAN, which is an overlay network encapsulation protocol. An overlay network created by VXLAN encapsulation is sometimes referred to as a VXLAN network, or simply VXLAN. When a VM 511-514 on the host machine 500 sends a data packet (e.g., an Ethernet frame) to another VM in the same VXLAN network but on a different host (e.g., other machines 580), the VTEP 550 will encapsulate the data packet using the VXLAN VNI and network addresses of the VTEP 550, before sending the packet to the physical network 590. The packet is tunneled through the physical network 590 (i.e., the encapsulation renders the underlying packet transparent to the intervening network elements) to the destination host. The VTEP at the destination host decapsulates the packet and forwards only the original inner data packet to the destination VM. In some embodiments, the VTEP 550 serves only as a controller interface for VXLAN encapsulation, while the encapsulation and decapsulation of VXLAN packets is accomplished at the uplink pipelines module 570.

The controller agent 540 receives control plane messages from a controller 560 (e.g., a CCP node) or a cluster of controllers. In some embodiments, these control plane messages include configuration data for configuring the various components of the virtualization software 505 (such as the MPSE 520 and the MPREs 530) and/or the virtual machines 511-514. In the example illustrated in FIG. 5, the controller agent 540 receives control plane messages from the controller cluster 560 from the physical network 590 and in turn provides the received configuration data to the MPREs 530 through a control channel without going through the MPSE 520. However, in some embodiments, the controller agent 540 receives control plane messages from a direct data conduit (not illustrated) independent of the physical network 590. In some other embodiments, the controller agent 540 receives control plane messages from the MPSE 520 and forwards configuration data to the router 530 through the MPSE 520.

In some embodiments, the controller agent 540 receives the data for creating logical switches and ports from the controllers 560. The controller agent 540 correspondingly configures the host machine 500 to implement the virtual switch and the virtual router, as well as the child logical ports and child logical switches. The controller agent 540 also configures the host machine 500 to implement VXLAN tunnels for the child logical ports to serve VLAN-tagged tenant traffic. The controller agent 540 also configures the host machine 500 to implement the interconnections between the child logical ports and the child logical switches in order to implement user-specified mappings between the tenant VLANs and the VXLAN tunnels.

The network data storage 545 in some embodiments stores some of the data that are used and produced by the logical forwarding elements of the host machine 500 (logical forwarding elements such as the MPSE 520 and the MPRE 530). Such stored data in some embodiments includes forwarding tables and routing tables, connection mappings, as well as packet traffic statistics. These stored data are accessible by the controller agent 540 in some embodiments and delivered to another computing device (e.g., controller 560.)

The MPSE 520 delivers network data to and from the physical NIC 595, which interfaces the physical network 590. The MPSE 520 also includes a number of virtual ports (vPorts) that communicatively interconnect the physical NIC 595 with the VMs 511-514, the MPREs 530, and the controller agent 540. Each virtual port is associated with a unique L2 MAC address, in some embodiments. The MPSE 520 performs L2 link layer packet forwarding between any two network elements that are connected to its virtual ports. The MPSE 520 also performs L2 link layer packet forwarding between any network element connected to any one of its virtual ports and a reachable L2 network element on the physical network 590 (e.g., another VM running on another host). In some embodiments, a MPSE 520 is a local instantiation of a LSE that operates across the different host machines and can perform L2 packet switching between VMs on a same host machine or on different host machines. In some embodiments, the MPSE 520 performs the switching function of several LSEs according to the configuration of those logical switches.

The MPREs 530 perform L3 routing on data packets received from a virtual port on the MPSE 520. In some embodiments, this routing operation entails resolving a L3 IP address to a next-hop L2 MAC address and a next-hop VNI (i.e., the VNI of the next-hop's L2 segment). Each routed data packet is then sent back to the MPSE 520 to be forwarded to its destination according to the resolved L2 MAC address. This destination can be another VM connected to a virtual port on the MPSE 520, or a reachable L2 network element on the physical network 590 (e.g., another VM running on another host, a physical non-virtualized machine, etc.).

As mentioned, in some embodiments, a MPRE is a local instantiation of a LRE that operates across the different host machines and can perform L3 packet forwarding between VMs on a same host machine or on different host machines. In some embodiments, a host machine may have multiple MPREs connected to a single MPSE, where each MPRE in the host machine implements a different LRE. MPREs and MPSEs are referred to as "physical" routing/switching elements in order to distinguish from "logical" routing/switching elements, even though MPREs and MPSEs are implemented in software in some embodiments. In some embodiments, a MPRE is referred to as a "software router", and a MPSE is referred to as a "software switch". In some embodiments, LREs and LSEs are collectively referred to as logical forwarding elements (LFEs), while MPREs and MPSEs are collectively referred to as managed physical forwarding elements (MPFEs). Some of the logical resources (LRs) mentioned throughout this document are LREs or LSEs that have corresponding local MPREs or a local MPSE running in each host machine.

In some embodiments, the MPRE 530 includes one or more logical interfaces (LIFs) that each serve as an interface to a particular segment (L2 segment or VXLAN) of the network. In some embodiments, each LIF is addressable by its own IP address and serves as a default gateway or ARP proxy for network nodes (e.g., VMs) of its particular segment of the network. In some embodiments, all of the MPREs in the different host machines are addressable by a same "virtual" MAC address (or vMAC), while each MPRE is also assigned a "physical" MAC address (or pMAC) in order to indicate in which host machine the MPRE operates.

The uplink module 570 relays data between the MPSE 520 and the physical NIC 595. The uplink module 570 includes an egress chain and an ingress chain that each perform a number of operations. Some of these operations are pre-processing and/or post-processing operations for the MPRE 530.

As illustrated by FIG. 5, the virtualization software 505 has multiple MPREs 530 for multiple, different LREs. In a multi-tenancy environment, a host machine can operate virtual machines from multiple different users or tenants (i.e., connected to different logical networks). In some embodiments, each user or tenant has a corresponding MPRE instantiation of its LRE in the host for handling its L3 routing. In some embodiments, though the different MPREs belong to different tenants, they all share a same vPort on the MPSE, and hence a same L2 MAC address (vMAC or pMAC). In some other embodiments, each different MPRE belonging to a different tenant has its own port to the MPSE.

The MPSE 520 and the MPRE 530 make it possible for data packets to be forwarded amongst VMs 511-514 without being sent through the external physical network 590 (so long as the VMs connect to the same logical network, as different tenants' VMs will be isolated from each other). Specifically, the MPSE 520 performs the functions of the local logical switches by using the VNIs of the various L2 segments (i.e., their corresponding L2 logical switches) of the various logical networks. Likewise, the MPREs 530 perform the function of the logical routers by using the VNIs of those various L2 segments. Since each L2 segment/L2 switch has its own a unique VNI, the host machine 500 (and its virtualization software 505) is able to direct packets of different logical networks to their correct destinations and effectively segregate the traffic of different logical networks from each other.

Many of the above-described features and applications are implemented as software processes that are specified as a set of instructions recorded on a computer-readable storage medium (also referred to as computer-readable medium). When these instructions are executed by one or more processing unit(s) (e.g., one or more processors, cores of processors, or other processing units), they cause the processing unit(s) to perform the actions indicated in the instructions. Examples of computer-readable media include, but are not limited to, CD-ROMs, flash drives, RAM chips, hard drives, EPROMs, etc. The computer-readable media does not include carrier waves and electronic signals passing wirelessly or over wired connections.

In this specification, the term "software" is meant to include firmware residing in read-only memory or applications stored in magnetic storage, which can be read into memory for processing by a processor. Also, in some embodiments, multiple software inventions can be implemented as sub-parts of a larger program while remaining distinct software inventions. In some embodiments, multiple software inventions can also be implemented as separate programs. Finally, any combination of separate programs that together implement a software invention described herein is within the scope of the invention. In some embodiments, the software programs, when installed to operate on one or more electronic systems, define one or more specific machine implementations that execute and perform the operations of the software programs.

Figure 6:
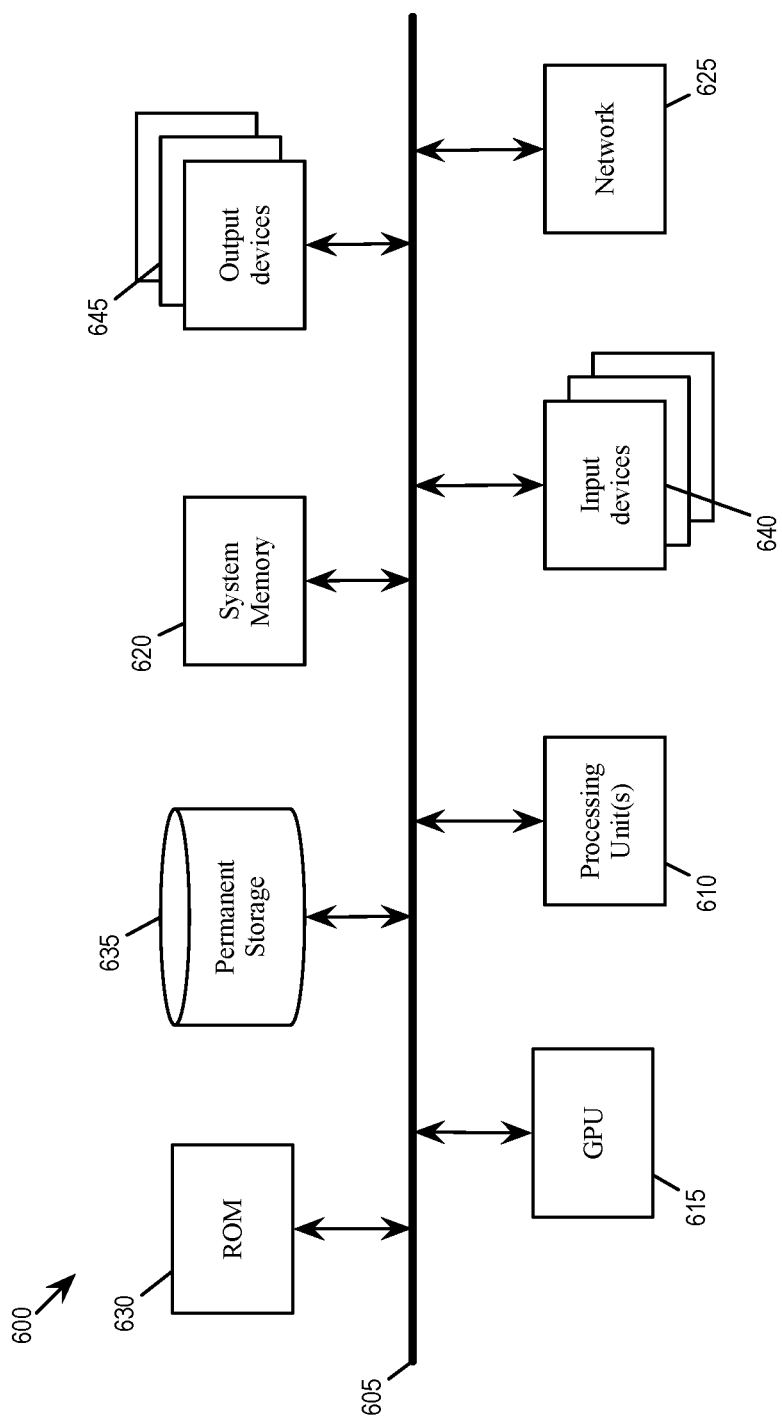
FIG. 6 conceptually illustrates a computer system with which some embodiments of the invention are implemented.

FIG. 6 conceptually illustrates a computer system 600 with which some embodiments of the invention are implemented. The computer system 600 can be used to implement any of the above-described hosts, controllers, and managers. As such, it can be used to execute any of the above-described processes. This computer system 600 includes various types of non-transitory machine-readable media and interfaces for various other types of machine-readable media. Computer system 600 includes a bus 605, processing unit(s) 610, a system memory 620, a read-only memory 630, a permanent storage device 635, input devices 640, and output devices 645.

The bus 605 collectively represents all system, peripheral, and chipset buses that communicatively connect the numerous internal devices of the computer system 600. For instance, the bus 605 communicatively connects the processing unit(s) 610 with the read-only memory 630, the system memory 620, and the permanent storage device 635.

From these various memory units, the processing unit(s) 610 retrieve instructions to execute and data to process in order to execute the processes of the invention. The processing unit(s) 610 may be a single processor or a multi-core processor in different embodiments. The read-only-memory (ROM) 630 stores static data and instructions that are needed by the processing unit(s) 610 and other modules of the computer system 600. The permanent storage device 635, on the other hand, is a read-and-write memory device. This device 635 is a non-volatile memory unit that stores instructions and data even when the computer system 600 is off. Some embodiments of the invention use a mass-storage device (such as a magnetic or optical disk and its corresponding disk drive) as the permanent storage device 635.

Other embodiments use a removable storage device (such as a floppy disk, flash drive, etc.) as the permanent storage device 635. Like the permanent storage device 635, the system memory 620 is a read-and-write memory device. However, unlike storage device 635, the system memory 620 is a volatile read-and-write memory, such as random-access memory. The system memory 620 stores some of the instructions and data that the processor needs at runtime. In some embodiments, the invention's processes are stored in the system memory 620, the permanent storage device 635, and/or the read-only memory 630. From these various memory units, the processing unit(s) 610 retrieve instructions to execute and data to process in order to execute the processes of some embodiments.

The bus 605 also connects to the input and output devices 640 and 645. The input devices 640 enable the user to communicate information and select commands to the computer system 600. The input devices 640 include alphanumeric keyboards and pointing devices (also called "cursor control devices"). The output devices 645 display images generated by the computer system 600. The output devices 645 include printers and display devices, such as cathode ray tubes (CRT) or liquid crystal displays (LCD). Some embodiments include devices such as a touchscreen that function as both input and output devices 640 and 645.

Finally, as shown in FIG. 6, bus 605 also couples computer system 600 to a network 625 through a network adapter (not shown). In this manner, the computer 600 can be a part of a network of computers (such as a local area network ("LAN"), a wide area network ("WAN"), or an Intranet, or a network of networks, such as the Internet. Any or all components of computer system 600 may be used in conjunction with the invention.

Some embodiments include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra-density optical discs, any other optical or magnetic media, and floppy disks. The computer-readable media may store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the above discussion primarily refers to microprocessor or multi-core processors that execute software, some embodiments are performed by one or more integrated circuits, such as application-specific integrated circuits (ASICs) or field-programmable gate arrays (FPGAs). In some embodiments, such integrated circuits execute instructions that are stored on the circuit itself.

As used in this specification, the terms "computer", "server", "processor", and "memory" all refer to electronic or other technological devices. These terms exclude people or groups of people. For the purposes of the specification, the terms display or displaying means displaying on an electronic device. As used in this specification, the terms "computer-readable medium," "computer-readable media," and "machine-readable medium" are entirely restricted to tangible, physical objects that store information in a form that is readable by a computer. These terms exclude any wireless signals, wired download signals, and any other ephemeral or transitory signals.

While the invention has been described with reference to numerous specific details, one of ordinary skill in the art will recognize that the invention can be embodied in other specific forms without departing from the spirit of the invention. Several embodiments described above include various pieces of data in the overlay encapsulation headers. One of ordinary skill will realize that other embodiments might not use the encapsulation headers to relay all of this data.

Also, several figures conceptually illustrate processes of some embodiments of the invention. In other embodiments, the specific operations of these processes may not be performed in the exact order shown and described in these figures. The specific operations may not be performed in one continuous series of operations, and different specific operations may be performed in different embodiments. Furthermore, the process could be implemented using several sub-processes, or as part of a larger macro process. Thus, one of ordinary skill in the art would understand that the invention is not to be limited by the foregoing illustrative details, but rather is to be defined by the appended claims.

We claim:

1. A method for connecting a physical gateway to a plurality of virtual local area networks (VLANs), the method comprising:

on a host computer that executes a virtual router and a virtual switch:

receiving a mapping between (i) VLAN identifiers for a plurality of tenant networks and (ii) overlay virtual network identifiers (VNIs) for a plurality of overlay networks associated with the plurality of tenant networks;

associating an interface of the virtual router with a parent logical port of the virtual switch in order to facilitate connectivity between the physical gateway and the plurality of tenant networks;

creating, for each particular tenant network, a child port on the virtual switch to serve as an interface for the particular tenant network, each particular child port associated with a particular VNI of the particular tenant network for which the particular child port is created;

associating the plurality of child ports with a plurality of child logical switches each of which is associated with one tenant network; and for a packet received at the parent logical port of the virtual switch, (i) using the received mapping to map the packet's associated VLAN identifier to a particular VNI specified for a particular tenant network, (ii) passing the packet to the child port associated with the particular VNI, and (iii) sending the packet to the physical gateway from the particular child port along a tunnel with the associated particular VNI embedded in a header of the tunnel.

2. The method of claim 1, wherein the host computer is a particular host computer, wherein the virtual router, the virtual switch, the plurality of child ports, and the plurality of child logical switches are implemented by one or more host computers running virtualization software including the particular host computer.

3. The method of claim 1, wherein the plurality of overlay networks are virtual extensible local area networks (VXLANs).

4. The method of claim 1, wherein each overlay network carries data traffic that is tagged with a VLAN identifier and encapsulated with a corresponding VNI according to the mapping.

5. The method of claim 1, further comprising validating the mapping between the VLAN identifiers and VNIs based on a pool of available VNIs.

6. The method of claim 1, wherein receiving the mapping comprises exposing an application program interface (API) and receiving a definition and update of the mapping from the API.

7. The method of claim 6, further comprising receiving, from the API, an overlay transport zone definition that identifies a collection of host computers that are within a span of the virtual switch.

8. The method of claim 1, wherein the virtual router comprises two or more parent logical ports, each parent logical port associated with a plurality of child ports.

9. The method of claim 1, wherein a first tenant has a first mapping between VLAN identifiers and VNIs and a second tenant has a second mapping between VLAN identifiers and VNIs, wherein a particular VLAN identifier is mapped to a first VNI for the first tenant and is mapped to a second, different VNI for the second tenant.

10. A computing device comprising:
one or more processors; and
a computer-readable storage medium storing a plurality of computer-executable components that are executable by the one or more processors to perform a plurality of actions for connecting a physical gateway to a plurality of virtual local area networks (VLANs), the plurality of actions comprising:
receiving a mapping between (i) VLAN identifiers for a plurality of tenant networks and (ii) overlay virtual network identifiers (VNIs) for a plurality of overlay networks associated with the plurality of tenant networks;
associating an interface of a virtual router executing on the computing device with a parent logical port of a virtual switch executing on the computing device, in order to facilitate connectivity between the physical gateway and the plurality of tenant networks;
creating, for each particular tenant network, a child port on the virtual switch to serve as an interface for the particular tenant network, each particular child port associated with a particular VNI of the particular tenant network for which the particular child port is created;
associating the plurality of child ports with a plurality of child logical switches each of which is associated with one tenant network; and
for a packet received at the parent logical port of the virtual switch, (i) using the received mapping to map the packet's associated VLAN identifier to a particular VNI specified for a particular tenant network, (ii) passing the packet to the child port associated with the particular VNI, and (iii) sending the packet to the physical gateway from the particular child port along a tunnel with the associated particular VNI embedded in a header of the tunnel.

11. The computing device of claim 10, wherein the host computer is a particular host computer, wherein the virtual router, the virtual switch, the plurality of child ports, and the plurality of child logical switches are implemented by one or more host computers running virtualization software including the particular host computer.

12. The computing device of claim 10, wherein the plurality of overlay networks are virtual extensible local area networks (VXLANs).

13. The computing device of claim 10, wherein each overlay network carries data traffic that is tagged with a VLAN identifier and encapsulated with a corresponding VNI according to the mapping.

14. The computing device of claim 10, wherein the plurality of actions further comprises validating the mapping between the VLAN identifiers and VNIs based on a pool of available VNIs.

15. The computing device of claim 10, wherein receiving the mapping comprises exposing an application program interface (API) and receiving a definition and update of the mapping from the API.

16. The computing device of claim 15, wherein the plurality of actions further comprises receiving, from the API, an overlay transport zone definition that identifies a collection of host computers that are within a span of the virtual switch.

17. The computing device of claim 10, wherein the virtual router comprises two or more parent logical ports, each parent logical port associated with a plurality of child ports.

18. The computing device of claim 10, wherein a first tenant has a first mapping between VLAN identifiers and VNIs and a second tenant has a second mapping between VLAN identifiers and VNIs, wherein a particular VLAN identifier is mapped to a first VNI for the first tenant and is mapped to a second, different VNI for the second tenant.

* * * * *